July 15, 1947.  W. ALLCOCK, JR  2,424,133
LIQUID LEVEL AND TEMPERATURE CONTROLLER
Filed Sept. 14, 1944  4 Sheets-Sheet 4

INVENTOR.
WILLIAM ALLCOCK, JUNR.
by Haseltine, Lake
ATTORNEYS.

Patented July 15, 1947

2,424,133

UNITED STATES PATENT OFFICE 2,424,133

LIQUID LEVEL AND TEMPERATURE CONTROLLER

William Allcock, Jr., Kingsbury, London, England, assignor to Fescol Limited, London, England, a company of Great Britain Application September 14, 1944, Serial No. 554,016
In Great Britain September 22, 1943

7 Claims. (Cl. 257—4)

1

The invention relates to apparatus of the kind in which operations are performed in a liquid contained in a tank or other receptacle and in which, by reason of the carrying out of these operations, there is a loss of liquid and a variation in the temperature thereof unless precautions are taken to maintain the level and temperature constant or within narrow limits as is necessary if the operations are to be performed in an efficient manner.

A particular field of application of the invention is in electro-plating or electro-deposition plant, wherein articles to be plated are immersed in a liquid electrolyte, such as a chromium solution, contained in a tank or vat and through which an electric current is passed. To ensure the necessary depth of liquid for proper immersion of the article to be plated it is necessary to have the liquid at a constant or substantially constant level. Moreover, for efficiency in other directions it is necessary to have the liquid at a predetermined temperature and to maintain it there. Where the working temperature is required to be above normal, a heating element, such as a steam or hot water coil or an electrical strip heater, is employed. Loss of level results firstly from the taking away of part of the liquid by its adherence to the articles as they are removed from the tank, and secondly from evaporation. Evaporation is consequent not only on the initial heat of the liquid but also on the additional heat imparted to it by the passage of the plating current, especially where considerable amperages are employed. The imparting of this additional heat creates the ancillary problem of keeping the temperature of the liquid to the desired predetermined value.

Compensation for loss of level is usually obtained by the provision of a ball float device which operates a valve controlling the passage of make-up liquid to the plating tank. In the case of small tanks, compensation for addition of heat is usually obtained by means of a cooling device in the form of a coil which is immersed in the liquid in the tank and to which a cooling medium such as water is supplied, while in the case of larger tanks, the usual practice is to provide the tank with a cooling device in the form of a jacket which is supplied with the cooling medium. It is, however, difficult to strike a balance in order to avoid appreciable fluctuations in the temperature at which it is desired to maintain the liquid in the tank, this difficulty being aggravated by the need for adding make-up liquid so as to maintain the proper level in the tank.

The present invention provides an arrangement whereby the level and temperature factors can be controlled automatically and with precision and reliability.

According to the invention there is provided a valve which, on the one hand, is acted on to control the supply of make-up liquid to the tank under the influence of variation in the liquid level therein, and which, on the other hand, is independently acted on to control the supply of liquid to the cooling device under the influence of two thermostats, one of which is associated with the liquid in the tank and the other of which is associated with the liquid in the cooling device.

By way of example, the invention will now be described with reference to the accompanying drawings as applied to an electro-deposition plant in which use is made of a plating tank containing the electrolyte liquid, the tank being provided with a jacket to which a cooling liquid is supplied, and in which both the make-up liquid and the cooling liquid are water. In the drawings—

Figure 1:
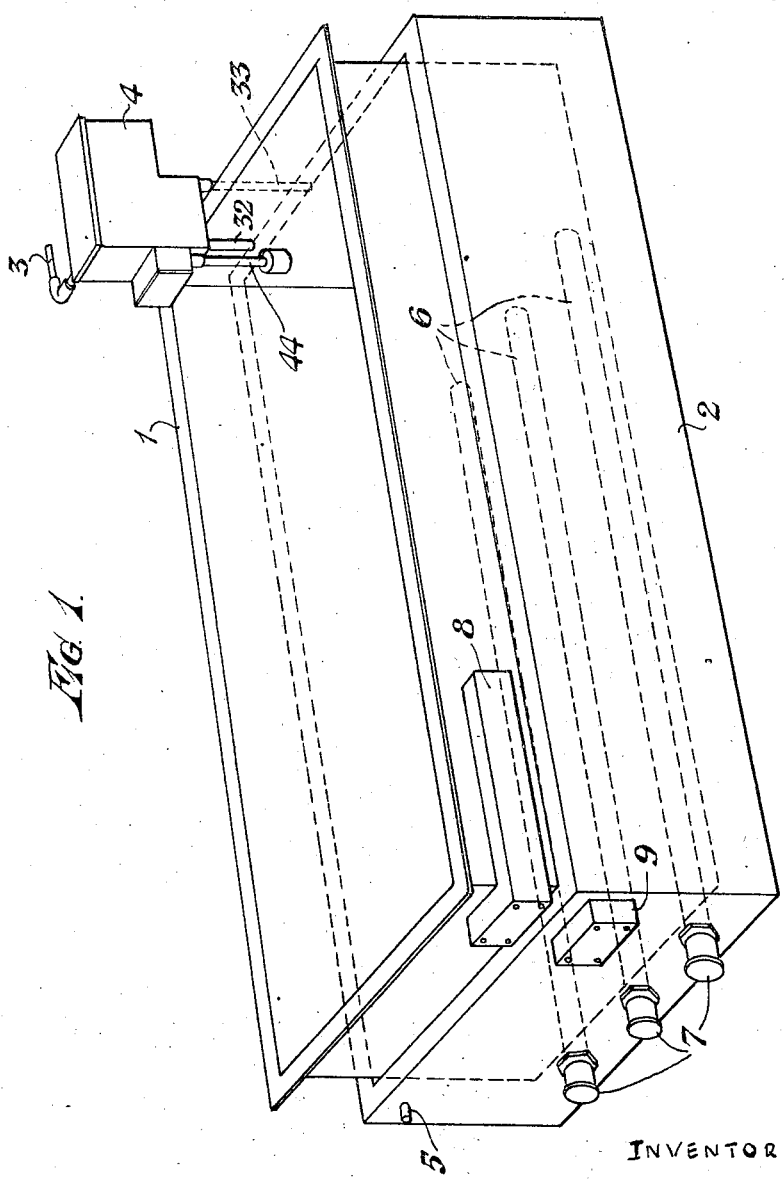
Figure 1 is a perspective view illustrating the general arrangement of the plant.

Referring to the drawings, but more particularly to the general arrangement depicted by Figure 1, the plating tank for the electrolyte liquid is indicated at 1, this tank being seated in and projecting from a jacket 2 to which cooling water is supplied. Electro-magnetically operated valve mechanism, described in detail later, and acting to control the flow of water from a single supply pipe 3 to either the plating tank 1 or the cooling jacket 2 according to requirements, is accommodated within a container 4 mounted on the upper edge of the plating tank. The cooling jacket has an overflow pipe 5. The liquid in the plating tank is heated by means of electric heating elements 6, the terminals 7 of which are arranged at the outside of the cooling jacket 2. A thermostat, generally indicated at 8, is secured to the outside of the plating tank 1 and is influenced by the temperature of the liquid in the tank. A second thermostat, generally indicated at 9, is secured to the outsid of the cooling jacket 2 and is influenced by the temperature of the water in the jacket. Supply of current from the mains to the electrical parts of the plant is controlled by a switch arranged in a switch box which also contains fuses and which is conveniently mounted on the wall of the plating room. Included in the electrical system is a relay which is also conveniently mounted on the wall.

Figure 2:
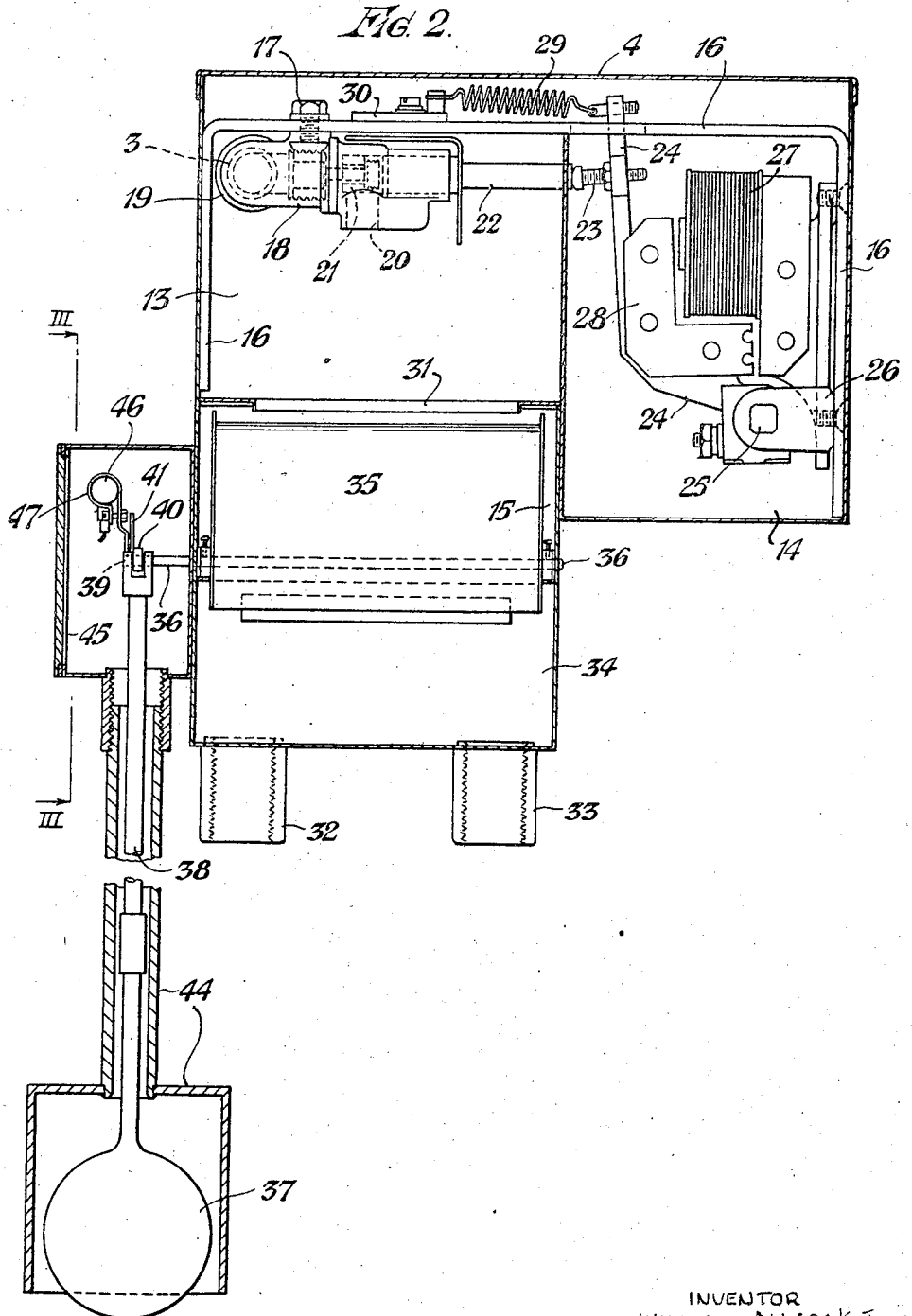
Figure 2 is a side view in section of the valve control arrangement.
Figure 3:
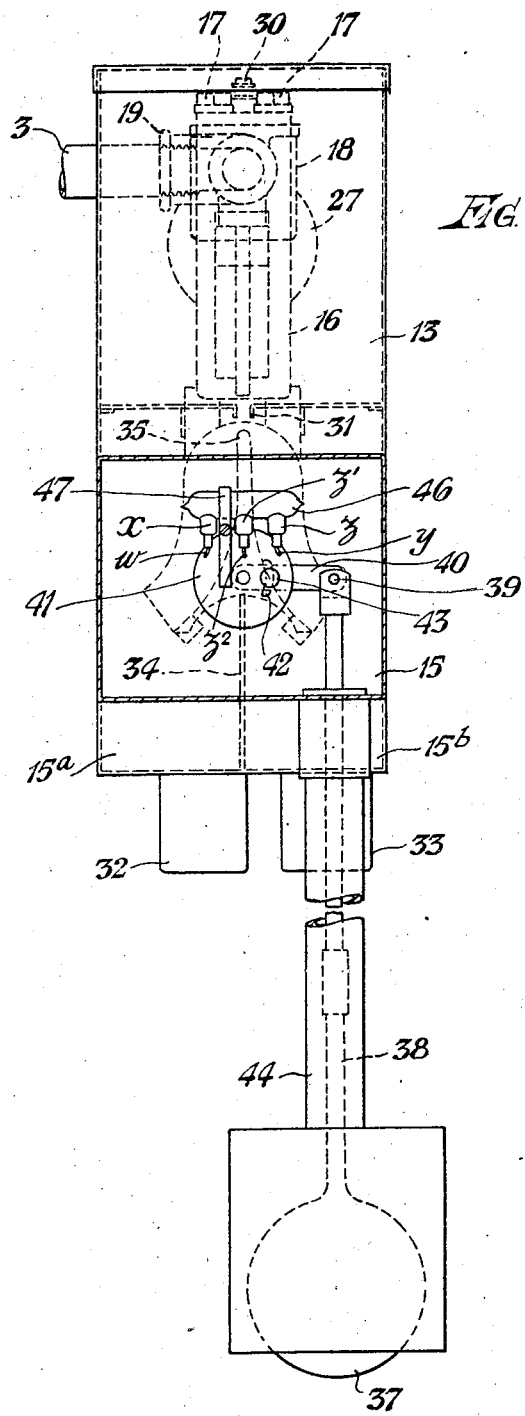
Figure 3 is an end view looking in the direction of the arrows III in Figure 2.
Figure 4:
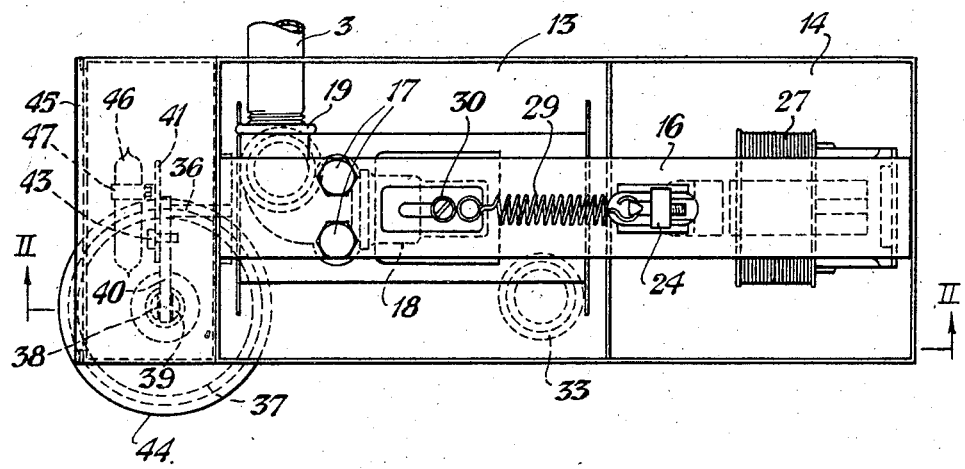
Figure 4 is a plan view corresponding to Figure 2.

It is now convenient to describe the construction and operation of the electro-magnetically operated valve mechanism, for which purpose reference is made to Figures 2 to 4. The container 4 is divided into three compartments, an upper compartment 13, a lateral compartment 14 and a lower compartment 15 arranged immediately beneath the compartment 13. There is mounted within the container 4 and extending between the compartments 13 and 14, an inverted U-shaped plate 16 to which is secured, by means of nuts 17, a valve casing 18. The inlet 19 of this casing is joined to the water supply pipe 3, while the outlet 20 of the casing opens into the compartment 13. The passage between the inlet 19 and outlet 20 is normally closed by a valve 21 whose stem 22 extends from the casing 18 into the compartment 14. Upon the extremity of the stem 22 bears an adjustable tappet 23 carried by the free end of a lever 24, the other end of which is fulcrumed at 25 to a bracket 26 which is secured to the plate 16 and supports an electro-magnet 27. To the lever 24 is secured iron plates 28 which constitute the armature of the electro-magnet. The electro-magnet 27 and its associated lever 24 are arranged in the compartment 14. The valve 21 is normally maintained in closed position by a spring 29 acting between the free end of the lever 24 and an anchor member 30 secured to the plate 16.

With the arrangement just described, when the electro-magnet 27 is energised, the armature will be attracted to it against the pull of the spring 29 and so the valve stem 22 will be relieved of the pressure of the tappet 23. Hence the valve 21 will be free to open under the pressure of the water in the supply pipe 3 and water will accordingly flow through the valve body 18 into the compartment 13 from the outlet 20. When the electro-magnet 27 is de-energized, the spring 29 will react to cause the lever 24 to move away from the electro-magnet so that pressure will be imposed by the tappet 23 upon the valve stem 22 to cause the valve 21 to close.

Water admitted to the compartment 16 passes through a centrally disposed slot 31 in the base of this compartment into the compartment 15 in the bottom of which are provided two outlet pipes 32 and 33, of which the pipe 32 leads to the plating tank 1 while the pipe 33 leads to the cooling jacket 2, these pipes being separated by an upwardly extending partition 34 arranged in alignment with the slot 31 and dividing the compartment 15 into two sub-compartments 15a and 15b. Between the upper edge of the partition 34 and the slot 31 there is provided a vane 55 which is secured to a shaft 36 mounted for rotation in the walls of the compartment 15 so that the vane can rock from side to side. When the vane is rocked to the right as viewed in Figure 3, water passing through the slot 31 will be deflected into the sub-compartment 15a and thence, through the outlet pipe 32, into the plating tank 1. When the vane is rocked to the left, water passing through the slot 31 will be deflected into the sub-compartment 15b and thence, through the outlet pipe 33, into the cooling jacket 2. When the vane is in its intermediate position, water from the slot 31 will be divided up so that part of it flows into the sub-compartment 15a while the other part flows into the sub-compartment 15b. Under these latter conditions, both the plating tank 1 and the cooling jacket will be fed with water simultaneously.

To cause the rocking movement to be imparted to the vane 35, use is made of a ball float 37 which floats on the liquid in the plating tank 1. This float is carried at the lower end of a rod 38 the upper end of which is pivoted at 39 to the outer end of a lever arm 40 connected to the vane 35. It will be seen that with this arrangement, when the ball float 37 descends, due to loss of level of liquid in the plating tank 1, the vane will be rocked to the right as viewed in Figure 3 so that water coming from the slot 31 will flow into the plating tank 1 where it will act as make-up, while when the float ascends as the result of the addition of the make-up water, the vane will be rocked to the left so that water coming from the slot 31 will then be fed to the cooling jacket where it will act to reduce the temperature of the water in this jacket, the surplus water in the jacket escaping through the overflow pipe 5 (Figure 1).

A convenient method of connecting the lever arm 40 to the vane 35, is to mount fast on the shaft 36 a disc 41 and to pivot the inner end of the lever arm on the shaft, the disc being provided with an arcuate slot 42 through which passes a screw 43 for clamping the lever arm to the disc. In this manner the angle of the lever arm relatively to that of the vane can be adjusted to a nicety.

To restrain the ball float 37 against swinging so that it remains steady during operation, the float, as well as its rod 38, are arranged in a housing which is open at its lower end and the upper end of which is secured to a box 45 fixed to the side of the casing 4 and accommodating the lever arm 40 and disc 41.

The box 45 also accommodates a two-way mercury switch 46 which is secured by a strap 47 to the disc 41 so that it partakes of the rocking movement of the vane 35. This switch is connected in circuits which include the electro-magnet 27 and switches influenced by the thermostats 8 and 9.

Figure 5:
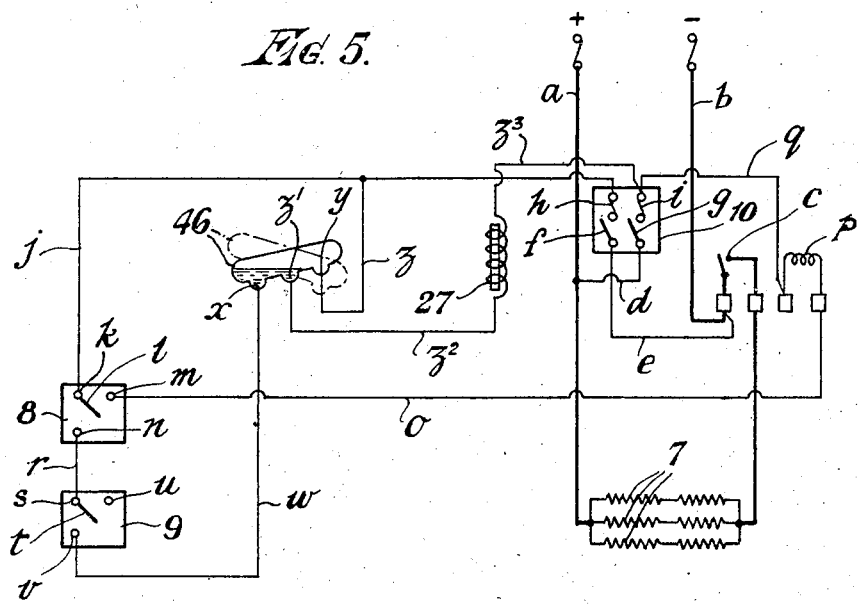
Figure 5 is a wiring diagram illustrating the circuits comprised.

It is now convenient to refer to the wiring diagram of Figure 5 which illustrates the various connections for the electrical part of the plant described in the foregoing. In this diagram the positive and negative main leads are indicated at $a$ and $b$. These leads supply current, through a switch $c$ arranged in the lead $b$, to the heating elements 7 which are connected in parallel. From the main leads $a$ and $b$ extend lines $d$ and $e$ respectively, the flow of current through these lines being controlled by switch arms $f$ and $g$ working in unison and which, with fuses $h$ and $i$ in the lines, are arranged in the switch box. From the fuse $h$ associated with the switch arm $f$ and line $e$, extends a line $j$ connected to the terminal $k$ of two-way switch constituted by a switch arm $l$ which is operated by the thermostat 8 associated with the plating tank 1 and is adapted to engage with either one of two contacts $m$ and $n$. The bridging of the terminal $k$ and contact $m$ in the switch arm $l$ is effected when the thermostat is influenced by a fall of temperature of the liquid in the plating tank below a predetermined value, while the bridging of the terminal $k$ and contact $n$ by the switch arm $l$ is effected when the thermostat is influenced by a rise of temperature of the liquid in the plating tank above that predetermined value.

From the contact $m$ there extends a line $o$ which is connected to a relay $p$ associated with the switch $c$ and from the relay extends a line $q$ connected by way of the fuse $i$ and switch arm $g$ to the line $d$ from the main lead $a$.

The contact $n$ is connected by a line $r$ to the terminal $s$ of a switch constituted by a switch arm $t$ which is operated by the thermostat 9 associated with the cooling jacket 2 and is adapted to engage with either one of two contacts $u$ and $v$. The bridging of the terminal $s$ and contact $u$ by the switch arm $t$ is effected when the thermostat 9 is influenced by a fall in the temperature of the water in the cooling jacket 2 below a predetermined value, while the bridging of the terminal $s$ and contact $v$ by the switch arm $t$ is effected when the thermostat is influenced by a rise of temperature of the water in the cooling jacket above that predetermined value.

From the contact $v$ extends a line $w$ which is joined to the left-hand contact $x$ of the mercury switch 46. The right-hand contact $y$ of the mercury switch is joined by a line $z$ to the line $j$. The centre contact $z'$ of the mercury switch is connected by a line $z^2$ to the winding of the electro-magnet 27 and thence by a line $z^3$ to the line $d$ by way of the fuse $i$ and switch arm $g$.

For the purpose of supplying make-up water to the plating tank 1, the opening and closing of the valve 21 is dependent on the movement of the float 37 which rides on the liquid in the tank. When the float sinks, due to a lowering of the level of the liquid in the tank, the mercury switch 46 is tilted in a direction such that a circuit to the electro-magnet 27 is closed through the contacts $z'$ and $y$. The consequent energization of the electro-magnet causes attraction of the armature 28 with consequent opening of the valve 21 against the pull of its spring 29, and passage of water through the valve body 18 into the compartment 13 and thence through the slot 31 into the compartment 15. At the same time the vane 35 has been rocked to cause the water coming through the slot 31 to be diverted into the sub-compartment 15a from which it flows into the plating tank. When the float rises due to restoration of the level of the liquid in the tank and the level has reached its maximum height, the mercury switch 46 will tilt in the opposite direction so that the circuit through the contacts $z'$ and $y$ is interrupted with consequent de-energization of the electro-magnet 27 and return of the valve 21 to closed position under the influence of its spring. At the same time the vane 35 will rock to divert water coming from the slot 31 into the sub-compartment 15b and thence into the cooling jacket 2, while the mercury in the switch 46 will bridge the contacts $z'$ and $x$ forming part of another circuit to the electro-magnet 27.

The closing of this other circuit to the electro-magnet 27 is not only dependent upon the bridging of the contacts $z'$ and $x$ but also on the influence of the thermostats 8 and 9 on the switch arms $l$ and $t$. The thermostats are series connected and, in effect, act to control the supply of water to the cooling jacket as well as the supply of current to the heating elements 7 through the relay $p$ and switch $c$. Let it be assumed, to start with, that conditions are normal, with the switch arms $f$ and $g$ in closed position and the liquid in the plating tank 1 at its highest level and at correct temperature and the water in the cooling jacket also at correct temperature. Under these conditions, the float 37 will have brought the vane 35 to a position for diverting water to the cooling jacket, the mercury switch 46 will be open at the contacts $z'$ and $y$, the switch $c$ connected with the relay $p$ will be open, and the switch arms $l$ and $t$ connected with the thermostats 8 and 9 will be in inoperative position. Hence, no current will flow in any part of the system and the valve 21 will be closed so that no water can flow into the compartment 13. If, now, the temperature of the liquid in the plating tank falls, the thermostat 8 will move the switch arm to bridge the contacts $k$ and $m$, thereby closing a circuit through main lead $a$, line $d$, switch arm $g$, fuse $i$, line $q$, relay $p$, line $o$, contacts $m$ and $k$, line $j$, fuse $h$, switch arm $f$ and line $e$ to main lead $b$, thereby resulting in energization of the relay $p$ and consequent closing of the switch $c$. Current will thereupon be supplied to the heating elements 7, resulting in a raising of the temperature of the liquid in the plating tank 1.

Part of the heat imparted to the liquid in the plating tank 1 in the manner just described, will, naturally, be absorbed by the water in the cooling jacket 2. Thus, the ultimate temperature of the liquid in the plating tank will depend upon the temperature of the liquid in the cooling jacket. When the temperature of the liquid in the plating tank exceeds a certain value, the thermostat 8 will act to cause the switch arm $l$ to move from the contact $m$ to the contact $n$ so that the circuit through the relay $p$ will be interrupted with consequent opening of the switch $c$ and cessation of the supply of current to the heating elements 7. The temperature of the water in the cooling jacket 2 will, at the same time respond to the excess of temperature of the liquid in the plating tank so that the thermostat 9 will act to move the switch arm $t$ so that it bridges the contacts $s$ and $v$. With the switch arm $l$ bridging the contacts $k$ and $n$ and the switch arm $t$ bridging the contacts $s$ and $v$, a circuit will be closed through main lead $a$, line $d$, switch arm $g$, fuse $i$, line $z^3$, winding of electro-magnet 27, line $z^2$, contacts $z'$ and $x$ of mercury switch 46, line $w$, contact $v$, switch arm $t$, contact $s$, line $r$, contact $n$, switch arm $l$, contact $k$, line $j$, fuse $h$, switch arm $f$, line $e$ and main lead $b$. The electro-magnet 27 will, accordingly, be energized to open the valve 21 so that the water will flow into the compartment 13 and thence through the slot 31 from which it will be deflected by the vane 35 into the sub-compartment 15b and from there into the cooling jacket 2. The water will continue to flow into the cooling jacket until the temperature of the liquid in the plating tank (as well as that of the water in the cooling jacket) is reduced to the desired degree, the surplus water in the cooling jacket escaping through the overflow pipe 5. The thermostats 8 and 9, responding to the reduction of temperature, will cause the switch arms $l$ and $t$ associated therewith, to move to open position so that the supply of current to the electro-magnet 27 is then interrupted and the valve 21 will close to cut off the supply of water from the feed pipe 3.

It will be noted that the contact $u$ for the switch arm $t$ associated with the thermostat 9 is "blind," that is to say, it does not take part in the closing or opening of any circuit and merely represents a bridging position of the switch arm $t$ corresponding to the position of the switch arm $l$ when the latter is bridging the contacts $k$ and $m$. The reason for this is that when the thermostats 8 and 9 respond to a fall of temperature below that desired, the switch arm $l$ associated with the thermostat 8 will be moved to bridge the contacts $k$ and $m$ and this alone is sufficient to restore the supply of current to the heating elements 7 without any assistance from the switch arm $t$.

Should the liquid in the plating tank 1 and the water in the cooling jacket 2 reach an excessively high temperature while the mercury switch 46 and vane 35 are in a position for supplying make-up water to the plating tank, the thermostats 8 and 9 will respond to cause their switch arms $l$ and $t$ to cut off the supply of current to the heating elements 7 and to place the electro-magnet 27 in their own circuit, but water flowing from the outlet 20 of the valve body 18 will not be diverted to the cooling jacket until the level of the liquid in the plating tank has been restored.

It will be appreciated that, at times, the vane 35 can be so positioned in relation to the mercury switch 27 with the valve 21 open under the influence of the float 37 and one or other of the thermostats 8 and 9, that conditions may arise when the water flowing from the outlet 20 of the valve will be divided up by the vane so that it is fed to both the plating tank 1 and cooling jacket 2 simultaneously, thereby also maintaining the level in the cooling jacket even when cooling of the jacket is unnecessary.

With the arrangement described, the two thermostats 8 and 9, although operating independently, act in consonance and between them strike a balance, ensuring that the supply of water to the cooling jacket 2 is such that the temperature of the liquid in the plating tank 1 is maintained within narrow predetermined limits. The arrangement, moreover, operates entirely automatically once the switch arms $f$ and $g$ have been closed, and ensures that the proper conditions as to level and temperature are maintained in an efficient and reliable manner.

What I claim is:

1. In apparatus of the kind hereinbefore referred to and comprising a tank adapted to contain liquid which is subject to variations of temperature and loss of level, a liquid heat exchanger in heat exchange relation with said tank, liquid level and temperature control mechanism comprising a valve for controlling a supply of liquid to said tank and heat exchanger, means acting under the influence of a deficiency in the liquid level in said tank for actuating said valve so as to cause make-up liquid to be supplied to said tank, and means including two thermostats, one associated with the liquid in said tank and the other with the liquid in said heat exchanger, for actuating said valve so as to cause liquid to be supplied to said heat exchanger according to variations in the temperature of the liquid in said tank and that in said heat exchanger.

2. In apparatus of the kind hereinbefore referred to and comprising a tank adapted to contain liquid which is subject to variations of temperature and loss of level, a liquid heat exchanger in heat exchange relation with said tank, liquid level and temperature control mechanism comprising a valve for controlling a flow of liquid from a source of supply, two outlets from said valve, one of said outlets being associated with the interior of said tank and the other with the interior of said heat exchanger, a movable vane acting to direct liquid coming from said valve towards the one or the other of said outlets, a float associated with the liquid in said tank and with said vane, said float being influenced by the rise and fall of the level of the liquid in said tank so as to move said vane, an electro-magnet which, when energised, opens said valve, a switch associated with and controlled by movement of said vane, a thermostat associated with said tank, a switch associated with and controlled by said thermostat, a thermostat associated with said heat exchanger, a switch associated with and controlled by said second-mentioned thermostat, and electrical connections between said electro-magnet and said switches such that when the level of the liquid in said tank falls below a predetermined level, the electro-magnet will be energised to open said valve so that liquid is supplied through the valve and directed by said vane into said tank, and when the liquid in the tank is at predetermined level and the temperatures in said tank and in said heat exchanger exceed a predetermined value respectively, the electro-magnet will be energised to open the valve so that liquid is supplied through the valve and is directed by the vane into the heat exchanger.

3. Liquid level and temperature control means in accordance with claim 2, including an electric heater for the liquid in said tank, and electrical connections to said heater and means for interrupting the supply of current to said heater when the temperature of the liquid in said tank exceeds a predetermined value.

4. Liquid level and temperature control means in accordance with claim 2, including an electric heater for the liquid in said tank and electrical connections including a relay and a switch operated by said relay for interrupting the supply of current through said connection to said heater when the temperature of the liquid in said tank exceeds a predetermined value.

5. Liquid level and temperature control means according to claim 2, wherein the switch whose position varies with movement of said vane, is a mercury switch having contacts so arranged that when the vane is in a position for directing liquid from said valve into said tank, a circuit through said electro-magnet will be closed so as to cause the electro-magnet to open the valve, while when the vane is in a position for directing liquid from the valve into said heat exchanger, another circuit through the electro-magnet will be placed in a condition for actuating the electro-magnet to close said valve depending on the position of the switches controlled by the thermostats.

6. Liquid level and temperature control means according to claim 2, wherein the outlet side of said valve opens into a compartment having a slot for flow of liquid from the valve into second compartment arranged beneath the first compartment, the second compartment being divided into two sub-compartments, one connected with the interior of said tank and the other connected with the interior of said heat exchanger.

7. Liquid level and temperature control means according to claim 2, wherein the outlet side of said valve opens into a compartment having a slot for flow of liquid from the valve into a second compartment arranged beneath the first compartment, the second compartment being divided into two sub-compartments, one connected with the interior of said tank and the other connected with the interior of said heat exchanger, and wherein said vane is situated in the lower compartment in coincidence with the said slot and is mounted for a rocking movement adapted to be imparted to it by said float, so that, when the vane is rocked to one side of the slot it diverts liquid passing through the slot into one of the said sub-compartments and, when rocked to the other side of the slot, it diverts the liquid passing through the slot into the other of the said sub-compartments.

WILLIAM ALLCOCK, JUNR.

REFERENCES CITED

The following references are of record in the file of this patent:

UNITED STATES PATENTS

| Number | Name | Date |
|---|---|---|
| 2,255,986 | Rapisarda | Sept. 16, 1941 |
| 1,051,060 | Balke | Jan. 21, 1913 |